Patented Feb. 9, 1937

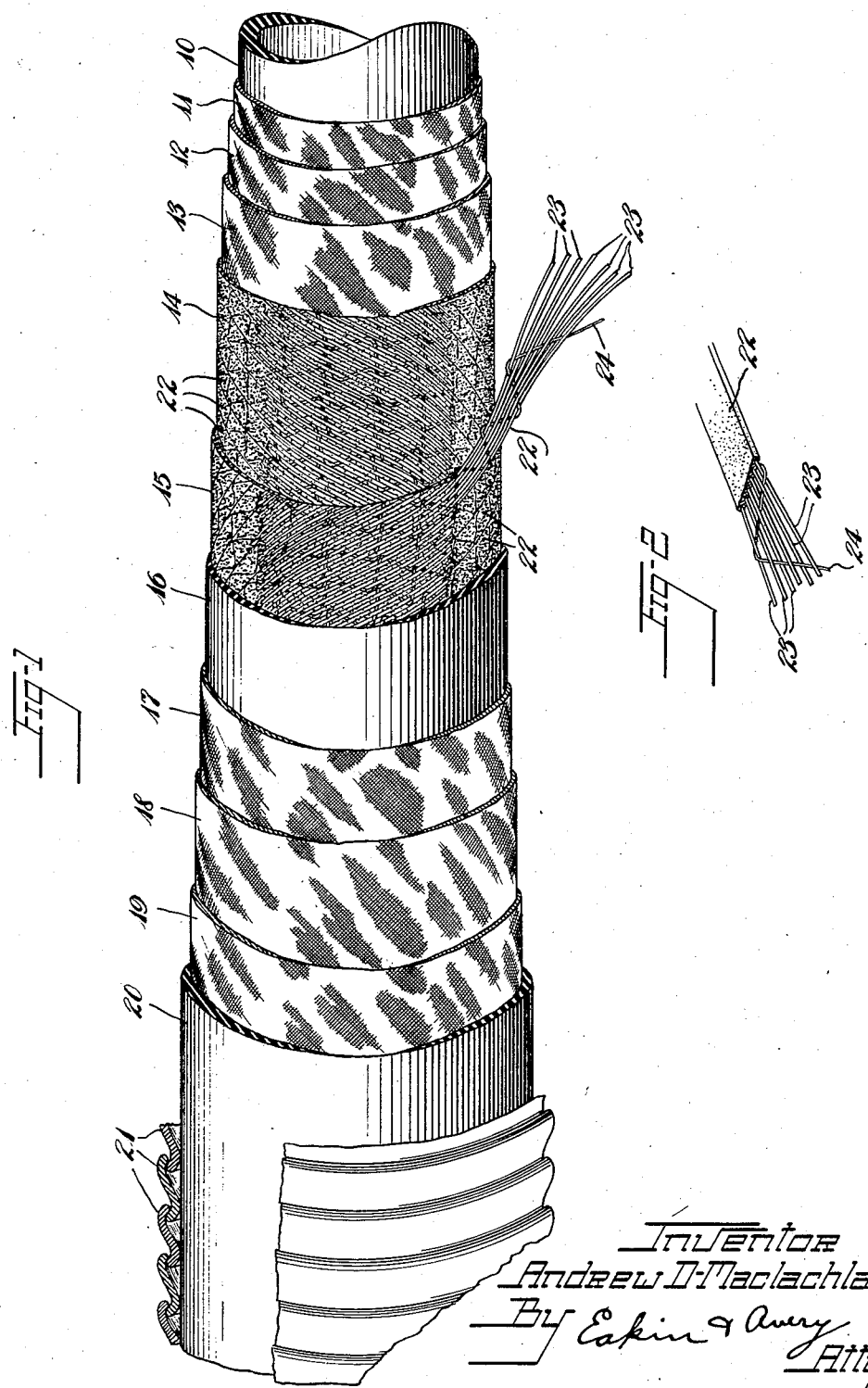

2,069,891

UNITED STATES PATENT OFFICE 2,069,891

HOSE

Andrew D. Maclachlan, Akron, Ohio, assignor to The B. F. Goodrich Company, New York, N. Y., a corporation of New York Application March 14, 1930, Serial No. 435,795

7 Claims. (Cl. 138—56)

This invention relates to hose, and more especially to reinforced hose for the conducting of fluids such as air, steam, water or the like under high pressure.

The chief objects of the invention are to provide a reinforced hose which will not twist, writhe or bend when subjected to internal pressure; to provide a reinforced hose capable of withstanding relatively high internal pressure without bursting; to provide a reinforced hose which will have relatively small elongation or radial expansion under high internal pressure; and to provide a hose construction which will accomplish the foregoing objects without the use of more reinforcement than is used in similar structures of less strength.

Of the accompanying drawing:

Fig. 1 is a perspective view of a portion of a hose embodying my invention in its preferred form, parts thereof being broken away and shown in section for clearness of illustration.

Fig. 2 is a sectional perspective view, on a larger scale, of a portion of one element of the hose-reinforcing structure.

Referring to the drawing, my improved hose comprises an internal tube or lining 10 of rubber, respective layers or plies of bias-laid, rubberized, woven fabric 11, 12 and 13 surrounding said lining 10, respective layers of reinforcing material 14, 15 superposed upon the fabric ply 13, a layer of rubber 16 upon the outer reinforcing ply 15, respective layers or plies of bias-laid, rubberized, woven fabric 17, 18, and 19 upon the rubber layer 16, and an outer layer 20 of rubber upon the outer fabric ply 19, all of said layers being vulcanized together to provide a unitary tubular structure. If desired, the hose may be provided exteriorly with metal armor, preferably in the form of overlapped and interlocked helical convolutions of a metal strip 21 which in section is ogee or reverse-curve form.

Although my improved hose as illustrated herein embodies my preferred construction for a particular purpose, its structure may be variously modified in the arrangement and character of its fabric plies and rubber plies to adapt it to other situations, its novelty residing primarily in the structural features and arrangement of its reinforcing layers 14, 15.

Each of the reinforcing layers 14, 15 comprises a plurality of strands of wire disposed in helical convolutions within the hose, the convolutions of the respective layers being disposed at the same pitch or angle with relation to the hose, but oppositely arranged as to the two layers so that the strands of one layer cross the strands of the other layer to produce a balanced structure. The layers 14, 15 preferably are insulated from each other with rubber and the respective strands of each layer in like manner preferably are insulated from each other.

The wire strands comprising the reinforcing layers 14, 15 preferably are applied to the hose structure in the form of continuous tapes 22, 22, the individual strands 23, 23 of which usually are made of hard steel of great strength to render the tapes inextensible, the strands 23 being held together in parallel relation by a weft or filler wire 24 which is passed under and over the longitudinal wires from side to side of the tape. The weft or filler wire is made of soft metal such as annealed steel or copper which is easily flexed. The tape 22 preferably is similar to the tire bead reinforcement of the patent to Robert C. Pierce, No. 1,512,796, issued October 21, 1924.

Before being built into the hose the tapes 22 are coated with rubber, as is clearly shown in Fig. 2, which rubber enters between the individual strands 23 of each tape because of their spaced apart condition due to the filler wire 24. The number of tapes required for each layer of reinforcement depends upon the circumference of the hose, the pitch of the convolutions, and the width of the tapes, the tapes being formed of such width as to lie in edge to edge relation at the proper pitch.

It is known that in a hose under pressure the resistance to rupture around the circumference is twice the resistance to longitudinal rupture, and that reinforcing material may be so incorporated in a hose as to present approximately twice the resistance to circumferential stresses that it presents to longitudinal stresses, with the result that an approximately balanced condition obtains within the hose, but as a perfect balance is only theoretically possible it is difficult in hose as heretofore constructed to provide a hose that will not expand either radially or longitudinally under internal pressure. The tapes as used in the present hose preferably are arranged to extend substantially one inch longitudinally of the hose for every two inches that they extend circumferentially thereof, and thus to approximate the balancing of the hose by simple tension, and their woven condition and their abutted relation provides the necessary resistance to shifting of their relative positions to maintain them in their original condition of pitch and thereby prevent excessive radial expansion or elongation of the hose. As there is little angular displacement of the constituent parts of the hose under pressure, ply separation is avoided.

By applying rubber to the tapes before building them into the hose, I am able to obtain substantially complete insulation of each strand 23, and completely to insulate the layer 14 from the layer 15. The insulation of the reinforcement strands is superior to any insulation that could be applied to braided or woven stranded reinforcement after the latter is applied to the hose, since the superposed strands would prevent the insulating material from reaching the underlying strands. Also it is impractical to braid or weave tapes or strands of the kind herein provided after they have been coated with unvulcanized rubber, since the rubber would be mutilated or scraped loose from the tapes as the result of the rough treatment given it by the braiding machine.

Tape of the kind herein provided, comprising substantially inextensible longitudinal strands held together by an interwoven flexible strand, possesses great tensile strength, and has substantial flexibility in the direction of its thickness, but has substantial stiffness in the direction of its width due to the filler strand which prevents movement of the respective strands of the tape with relation to each other, and produces a lattice-girder effect which gives to the tape the relatively great transverse rigidity inherent in that type of structure. The transverse rigidity of the tapes is augmented in each layer by the edge to edge positions which they occupy in the hose, with the result that each convolution of tape provides lateral support for adjacent convolutions, and yet the hose has adeuate flexibility for many uses.

Thus I provide the hose with a reinforcing structure which presents great resistance to angular displacement, and thereby permits such small departures in the angularity of the strands 23 with relation to the hose, from the theoretical ideal angle described, as are incidental to the manufacture of the hose in large quantity, without materially affecting its ability to maintain uniform volumetric capacity under all conditions.

The filler strands 24, being relatively soft, are readily deformable so that the strands 23 are not subject to shearing strains such as obtain where the reinforcing tape comprises a tubular or flat braided structure. Shearing strains which are present in hose reinforcement comprising a metal sheath which is braided onto the hose, due to the crossing of the strands thereof, are avoided in my improved hose, and the several objects set forth in the foregoing statement of objects are attained.

My invention may be modified within the scope of the appended claims as I do not limit my claims wholly to the specific construction shown and described.

I claim:

1. A hose having incorporated therein a reinforcing structure comprising crossed windings of tapes of parallel strands of wire, the strands of each tape being bound together by a weft wire.

2. A hose having incorporated therein a reinforcing structure comprising helical convolutions of tape arranged substantially in edge-to-edge relation, said tape comprising parallel strands of wire bound together by a weft wire.

3. A hose having incorporated therein a reinforment comprising tape consisting of parallel strands of wire bound together by a weft wire, said tape being disposed helically substantially at an advance of two inches circumferentially of the hose to each inch longitudinally thereof.

4. A hose comprising a body of rubber-like material and having a plurality of spirally wound layers, said layers being wound in opposite directions whereby the convolutions cross each other and at least one of said layers being formed of metallic mesh material and being embedded in the rubber-like material, each layer comprising a plurality of spirally wound strips of material.

5. A hose having incorporated therein a plurality of layers of helically-wound metallic mesh tape, the layers being disposed in crossed relation and each comprising a plurality of tapes, and the tapes of the layers being disposed in such a long pitch that they advance substantially one inch longitudinally of the hose for every two inches of advance circumferentially, whereby the resistance of the hose to longitudinal stretch and the resistance thereof to circumferential expansion are substantially balanced.

6. A hose comprising a body of rubber-like material and having a plurality of spirally wound layers, said layers being wound in opposite directions whereby the convolutions cross each other and at least one of said layers being formed of metallic mesh material and being embedded in the rubber-like material, each layer comprising a plurality of spirally wound strips of material disposed at a long pitch such that they coact with the other materials of the hose body to prevent excessive radial expansion and longitudinal elongation of the hose under high internal fluid pressure.

7. A hose having incorporated therein a plurality of layers of helically-wound metallic mesh strip material, the layers being disposed in crossed relation and each comprising a plurality of strips, and the strips of the layers being disposed at a long pitch such that by their coaction with the other materials of the hose body the resistance of the hose to longitudinal elongation and the resistance thereof to circumferential expansion under high internal fluid pressure are approximately balanced.

ANDREW D. MACLACHLAN.